(12) United States Patent
Benoit

(10) Patent No.: US 8,490,993 B2
(45) Date of Patent: Jul. 23, 2013

(54) SELF-TRACKING CART

(75) Inventor: Serge Benoit, Quebec (CA)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/040,879

(22) Filed: Mar. 4, 2011

(65) Prior Publication Data

US 2012/0223501 A1 Sep. 6, 2012

(51) Int. Cl.
*B62K 27/00* (2006.01)
*B62D 63/00* (2006.01)

(52) U.S. Cl.
USPC ...... 280/204; 280/79.11; 280/79.2; 280/79.3; 280/91.1; 280/93.51; 280/87.01; 280/656; 410/2; 410/3; 410/7

(58) Field of Classification Search
USPC .......................................... 280/204
See application file for complete search history.

(56) References Cited

U.S. PATENT DOCUMENTS

| | | | |
|---|---|---|---|
| 3,211,467 A | 10/1965 | Siddall et al. | |
| 3,313,378 A * | 4/1967 | Jeffery et al. | 188/21 |
| 3,529,848 A | 9/1970 | Harvey et al. | |
| 3,620,549 A | 11/1971 | Miller et al. | |
| 3,637,236 A * | 1/1972 | Shimoji et al. | 280/419 |
| 3,820,811 A | 6/1974 | Lapham | |
| 3,853,330 A | 12/1974 | Hanaoka | |
| 4,120,509 A | 10/1978 | Reeve et al. | |
| 4,934,726 A | 6/1990 | Daenens et al. | |
| 4,949,986 A * | 8/1990 | Gohier | 280/410 |
| 5,090,719 A * | 2/1992 | Hanaoka | 280/408 |
| 5,704,623 A * | 1/1998 | Chapman | 280/47.11 |
| 5,720,352 A * | 2/1998 | Tharaldson | 172/248 |
| 5,725,230 A | 3/1998 | Walkup | |
| 5,899,482 A | 5/1999 | Kimura | |
| 6,619,680 B2 * | 9/2003 | Platteeuw et al. | 280/100 |
| 6,866,463 B2 * | 3/2005 | Riordan et al. | 414/498 |
| 7,571,916 B2 * | 8/2009 | Skiles | 280/100 |
| 7,806,646 B2 * | 10/2010 | Riordan et al. | 414/498 |
| 7,926,833 B2 * | 4/2011 | Hellbusch | 280/442 |
| 8,302,975 B2 * | 11/2012 | Hergeth | 280/47.19 |
| 2003/0079927 A1 | 5/2003 | Platteeuw et al. | |
| 2003/0197342 A1 * | 10/2003 | Bidwell | 280/91.1 |
| 2011/0084466 A1 * | 4/2011 | Olsen | 280/491.2 |

FOREIGN PATENT DOCUMENTS

WO    WO 2009036750 A2 *  3/2009

OTHER PUBLICATIONS

C-MAC Industries, [online]; [retrieved on May 22, 2009]; retrieved from the Internet: http://www.cmac.com.au/trailers.html#deluxetrailer.

* cited by examiner

*Primary Examiner* — J. Allen Shriver, II
*Assistant Examiner* — Conan Duda
(74) *Attorney, Agent, or Firm* — Cantor Colburn LLP; Matthew Zehrer

(57) ABSTRACT

A self-tracking cart is provided and includes a body defining an enclosure into and from which a secondary cart is receivable and removable, selectively rotatable first and second hitch assemblies, first and second motive elements, first and second steering assemblies to turn the first and second motive elements in opposite directions responsive to rotations of the first and second hitch assemblies and a linkage, which is coupled to the first and second hitch assemblies to cause the first and second hitch assemblies to rotate jointly in opposing directions, the linkage being disposed for non-interference with the secondary cart during reception and removal thereof into and from the enclosure.

20 Claims, 2 Drawing Sheets

SELF-TRACKING CART

BACKGROUND

Figure 1:
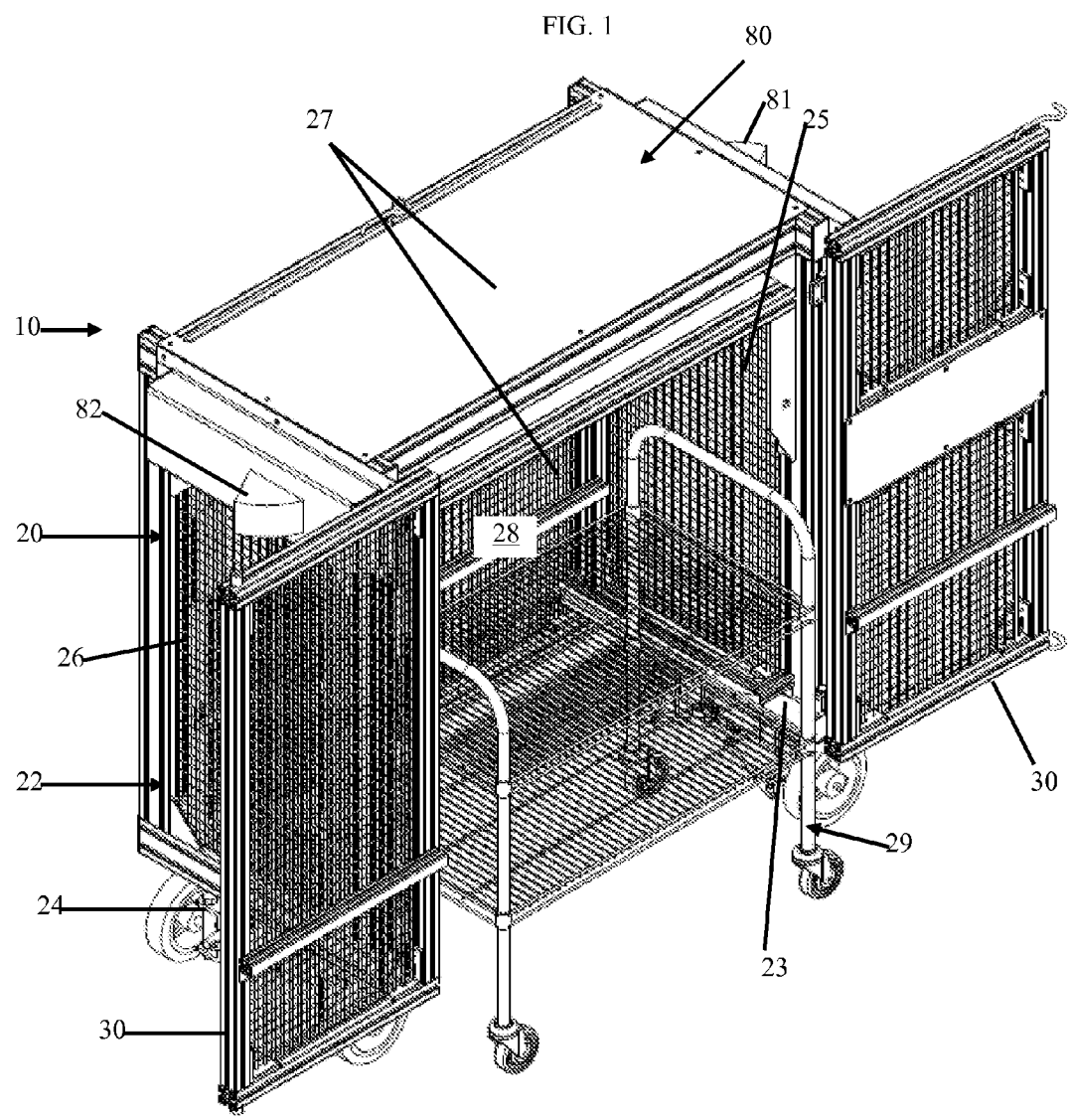

Aspects of the present invention are directed to a self-tracking cart.

Various types of carts can be used in different settings to facilitate the movement of loads through given spaces. For example, luggage carts can be used to move large amounts of luggage throughout airports. Often, these luggage carts are provided as part of a train of luggage carts that are sequentially attached to one another and, at the front end, to a tractor vehicle that pulls the train along. The connections between the tractor vehicle and the first luggage cart and the connections between each adjacent luggage cart may be provided by any type of hitch system, such as a tongue linkage mechanism or a trailer hitch connection. In any case, the hitch system transmits pulling and turning forces from a lead item in the train to a trailing item.

While airport pathways are generally wide and do not often require that luggage cart trains have tight turning controls, this is of course not always the case. In many cases, it is necessary for the luggage cart trains to make tightly controlled turns at sharp corners, in narrow pathways or where bystanders are nearby.

Cart trains in other industries, such as factory environments, are also subject to stringently controlled steering requirements. In particular, in computing and semi-conductor manufacturing warehouses that span large areas, it is often necessary to transport large amounts of highly sensitive and expensive goods from one sector to another through very narrow pathways. In these cases, it is especially important that the cart trains be able to maneuver precisely so as not to upset their respective loads.

Despite these concerns, cart trains are typically not designed to be highly maneuverable and, therefore, the movement of luggage throughout airports and the movement of highly sensitive and expensive goods from one sector to another in a manufacturing warehouse must be done slowly and carefully. This represents a significant cost in terms of time and manpower. Moreover, even when the movements are executed slowly and carefully, damage due to maneuvering difficulties is often unavoidable.

SUMMARY

In accordance with an aspect of the invention, a self-tracking cart is provided and includes a body defining an enclosure into and from which a secondary cart is receivable and removable, selectively rotatable first and second hitch assemblies, first and second motive elements, first and second steering assemblies to turn the first and second motive elements in opposite directions responsive to rotations of the first and second hitch assemblies and a linkage, which is coupled to the first and second hitch assemblies to cause the first and second hitch assemblies to rotate jointly in opposing directions, the linkage being disposed for non-interference with the secondary cart during reception and removal thereof into and from the enclosure.

In accordance with an aspect of the invention, a self-tracking cart is provided and includes a body defining an enclosure into and from which a secondary cart is receivable and removable, selectively rotatable first and second hitch assemblies, first and second motive elements, first and second steering assemblies to turn the first and second motive elements in opposite directions responsive to rotations of the first and second hitch assemblies and a linkage including vertically extensive end bars jointly rotatable with the first and second hitch assemblies and a linkage assembly coupled to the end bars to cause the end bars to rotate jointly in opposing directions, the linkage assembly being disposed to be vertically offset from the secondary cart during reception and removal thereof into and from the enclosure.

In accordance with an aspect of the invention, a self-tracking cart is provided and includes a body including lead and trailing axles, lead and trailing end walls supported on the lead and trailing axles, respectively, and an intermediate wall extending between the end walls to define an enclosure into and from which a secondary cart is receivable and removable, selectively rotatable first and second hitch assemblies, first and second motive elements, first and second steering assemblies to turn the first and second motive elements in opposite directions responsive to rotations of the first and second hitch assemblies and a linkage including vertically extensive end bars jointly rotatable with the first and second hitch assemblies and a linkage assembly coupled to the end bars to cause the end bars to rotate jointly in opposing directions, the linkage assembly being disposed to be vertically offset from the secondary cart during reception and removal thereof into and from the enclosure.

BRIEF DESCRIPTIONS OF THE SEVERAL VIEWS OF THE DRAWINGS

Figure 2:
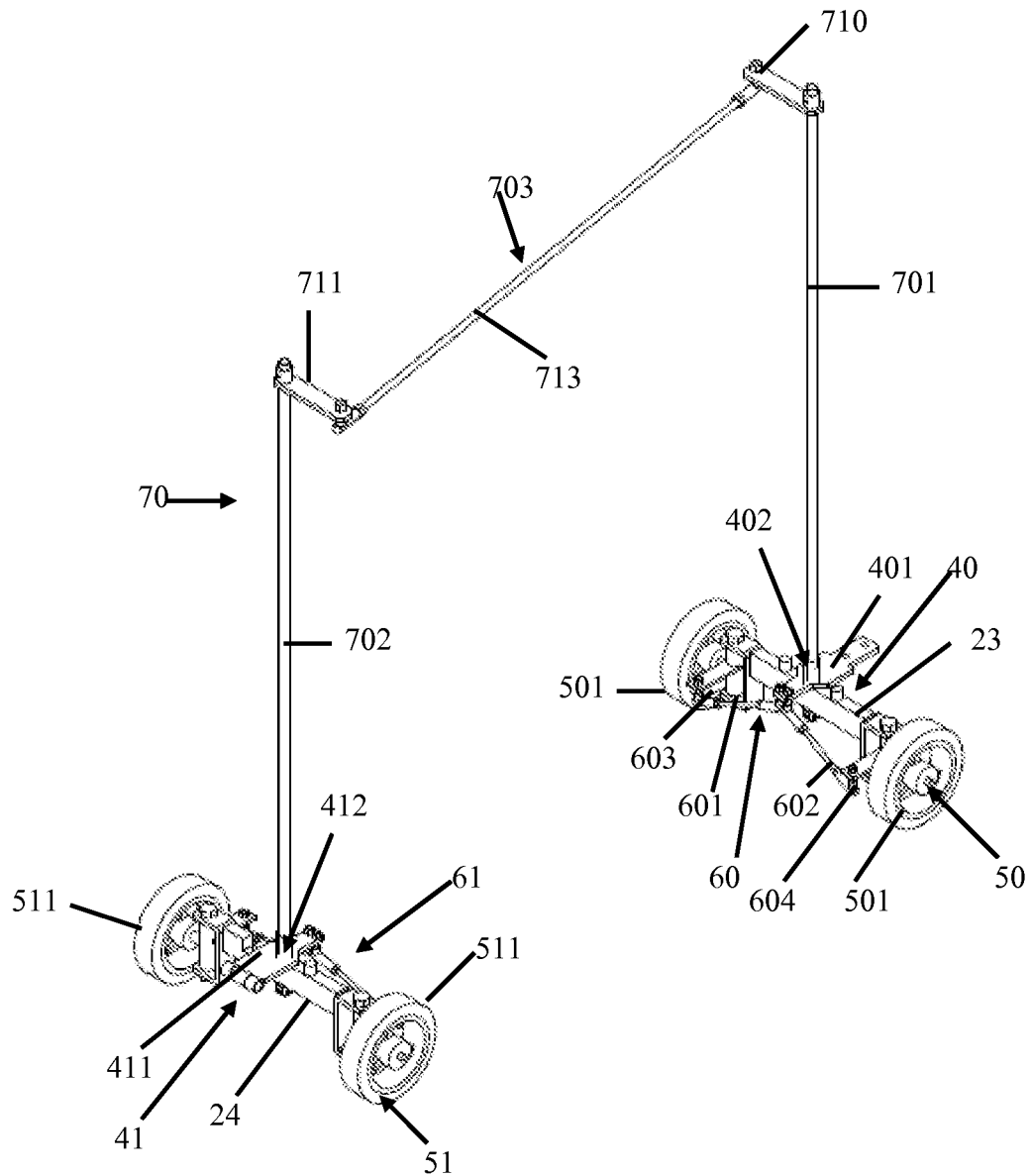

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a perspective view of a self-tracking cart in accordance with embodiments of the invention; and FIG. 2 is a perspective view of components of the self-tracking cart of FIG. 1.

DETAILED DESCRIPTION

With reference to FIGS. 1 and 2, a self-tracking cart 10 is provided and can be driven or pulled by a tractor vehicle or some other similar driving machine. The self-tracking cart 10 may be provided as a single cart or in a train of carts. To this end, the self-tracking cart 10 includes a body 20. The body 20 may be formed as a cage 22 including lead and trailing axles 23 and 24, lead and trailing end walls 25 and 26, which are supported on the lead and trailing axles 23 and 24, respectively, and an intermediate wall 27. The intermediate wall 27 extends between the lead and trailing end walls 25 and 26 and serves to provide structural support for the body 20. The intermediate wall 27 may be provided as a side wall and/or a top wall. The cage 22 is thus formed to define an enclosure 28 into and from which a secondary cart 29 having storage capability is receivable and removable. The cage 22 and the enclosure 28 may be, for example, substantially rectangular.

The body 20 may also include one or more doors 30 that permit access to an interior of the enclosure 28 such that the secondary cart 29 is slidably receivable and slidably removable from the enclosure 28. In accordance with embodiments, the secondary cart 29 is fully receivable in this manner in the enclosure 28 and may have a size and a shape that is substantially similar to available space within the enclosure 28. In this way, as the self-tracking cart 10 is moved or transported along a surface, the secondary cart 29 is also moved or transported along the surface with relative movement between the self-tracking cart 10 and the secondary cart 29 limited.

With lead end wall 25 supported on the lead end axle 23 and the trailing end wall 26 supported on the trailing end axle 24, the lead and trailing end axles 23 and 24 are indirectly connected to one another by way of structural support of the body 20. They are otherwise structurally independent with no structural connection (i.e., a chassis member or some other similar structure) between the lead end axle 23 and the trailing end axle 24 being necessary. As such, with no structural connection between the lead end axle 23 and the trailing end axle 24, the ingress and egress of the secondary cart 29 with respect to the enclosure 28 is not impeded.

With reference to FIG. 2, the body 20 includes selectively rotatable first and second hitch assemblies 40 and 41. The first hitch assembly 40 may be disposed at or proximate to the lead end wall 25 and includes an elongate connection member 401 that is pivotable about a mid-point 402 thereof. The second hitch assembly 41 may be disposed at or proximate to the trailing end wall 26 and includes an elongate connection member 411 that is pivotable about a midpoint 412 thereof. In accordance with embodiments of the invention, the elongate connection members 401 and 411 may each be provided as tongues or trailer hitches. Also, the first and second hitch assemblies 40 and 41 need not be disposed proximate to the lead and trialing end walls 25 and 26 and may be, for example, disposed at or proximate to the intermediate wall 27.

The first hitch assembly 40 may be configured to be pulled by a tractor vehicle, a preceding cart or an operator. Similarly, the second hitch assembly 41 may be configured to pull a trailing cart. Where the first hitch assembly 40 is pulled by a tractor vehicle, for example, forward movement of the tractor vehicle leaves the elongate connection member 401 to remain rotationally and pivotally secure about the midpoint 402. However, when the tractor vehicle turns to the left or right, the elongate connection member 401 correspondingly turns counter-clockwise or clockwise, respectively, about the midpoint 402.

The body 20 also includes first motive elements 50, which are connected to the lead end axle 23 and second motive elements 51, which are connected to the trailing end axle 24. The first motive elements 50 may include, for example, a pair of wheels 501 or treads that are connected to opposite ends of the lead end axle 23. Similarly, the second motive elements 51 may include for example a pair of wheels 511 or treads that are connected to opposite ends of the trailing end axle 24.

The self-tracking cart 10 further includes a first steering assembly 60, a second steering assembly 61 and a linkage 70. The first steering assembly 60 turns the first motive elements 50 relative to the lead end axle 23 and the second steering assembly 61 turns the second motive elements 51 relative to the trailing end axle 24. The lead end axle 23 and the trailing end axle 24 remain rotationally secure relative to the orientation of the body 20 during rotation of the first and second motive elements 50 and 51. Also, as will be described below, the first and second steering assemblies 60 and 61 respectively turn the first and second motive elements 50 and 51 in opposite directions in response to rotations of the first and second hitch assemblies 40 and 41 by way of the linkage 70. Thus, when the exemplary tractor vehicle turns to the left, the elongate connection member 401 correspondingly turns counter-clockwise about the midpoint 402. This causes the first steering assembly 60 to turn the first motive elements 50 to the left and, by way of the linkage 70, also causes the second steering assembly 61 to turn the second motive elements 51 to the right.

In accordance with embodiments, the first steering assembly 60 may include a left side steering rod 601 and a right side steering rod 602. The left side steering rod 601 is coupled at opposite ends thereof to an end of the elongate connection member 401 and a controller 603 that controls an orientation of a corresponding one of the first motive elements 50. The right side steering rod 602 is coupled at opposite ends thereof to the end of elongate connection member 401 and a controller 604 that controls an orientation of another corresponding one of the first motive elements 50. The opposite end of the elongate connection member 401 may be coupled to the exemplary tractor vehicle. When the exemplary tractor vehicle turns to the left and the elongate connection member 401 correspondingly turns counter-clockwise, the left side steering rod is pulled away from the controller 603 and the right side steering rod 602 is pushed toward the controller 604. This causes the first motive elements 50 to each turn leftwardly. The second steering assembly 61 may be similarly constructed.

The linkage 70 is coupled to each of the first and second hitch assemblies 40 and 41 and is configured to cause the first and second hitch assemblies 40 and 41 to rotate jointly in opposing directions. Thus, when the first hitch assembly 40 rotates counter-clockwise, the linkage 70 causes the second hitch assembly 41 to rotate clockwise. The linkage 70 is also disposed for non-interference with the secondary cart 29 during reception and removal thereof into and from the enclosure 28. That is, the linkage 70 is configured to mechanically extend from the first hitch assembly 40 to the second hitch assembly 41 is such a way as to avoid contact or interference with the secondary cart 29 while the secondary cart 29 is slidably (or otherwise) moved into and out of the enclosure 28.

In accordance with embodiments, the linkage 70 may include lead and trailing end vertically extensive end bars 701 and 702, which are jointly rotatable with the first hitch assembly 40 and the second hitch assembly 41 about the respective midpoints thereof 402 and 412, and a linkage assembly 703. The elongate connection members 401 and 411 may include receiving portions at the respective midpoints 402 and 412 into which the lead and trailing end vertically extensive end bars 701 and 702 extend. The linkage assembly 703 is coupled to the lead and trailing end vertically extensive end bars 701 and 702 at respective distal or upper ends thereof and is configured to cause the lead and trailing end vertically extensive end bars 701 and 702 to rotate jointly in opposing directions. With the linkage assembly coupled at the respective distal or upper ends, the linkage assembly 703 is therefore disposed to be vertically offset from the secondary cart 29 during reception and removal thereof into and from the enclosure 28. It is to be understood, however, that other embodiments exist in which the linkage assembly 703 is not necessarily vertically offset of the secondary cart 29. In these embodiments, the linkage may extend about a perimeter of the enclosure 28 and the linkage 70 may not include the lead and trailing end vertically extensive end bars 701 and 702.

Where the linkage assembly 703 is vertically offset, the linkage assembly 703 includes a first lateral member 710, a second lateral member 711 and a connection member 713. The first lateral member 710 is disposed at or proximate to the lead end wall 25 to convert rotation of the lead end vertically extensive end bar 701 into a pulling or pushing force. The second lateral member 711 is disposed at or proximate to the trailing end wall 26 to convert that pulling or pushing force into an oppositely directed rotation of the trailing end vertically extensive end bar 702. The connection member 713 is rotatably coupled at opposite ends thereof to the first and second lateral members 710 and 711, respectively, to transmit the pulling or pushing force from the first lateral member 710 to the second lateral member 711.

That is, as a left turn is applied to the first hitch assembly 40, the elongate connection member 401 and the lead end vertically extensive end bar 701 are each made to rotate counter-clockwise about the midpoint 402 while the first steering assembly 60 causes the first motive elements 50 to turn to the left. Meanwhile, the first lateral member 710 also rotates with the lead end vertically extensive end bar 701. This causes the connection member 713 to translate and, in turn, this causes the second lateral member 711 to rotate the trailing end vertically extensive end bar 702 in the clockwise direction about the midpoint 412. The second hitch assembly 41 thus also rotates about the midpoint 412 in the clockwise direction and the second steering assembly 61 therefore causes the second motive elements 51 to turn to the right. With the first motive elements 50 turning to the left and the second motive elements 51 turning to the right, the body 20 can execute the left turn with a reduced turning radius and therefore greater control.

The response of the self-tracking cart 10 to a right turn is similar to the description above. Also, it is to be understood that other configurations of the various components, such as the linkage 703, are possible without departing from the scope of the application.

With reference back to FIG. 1, the self-tracking cart 10 may further include a housing 80 to house the linkage 703. Where the linkage 703 is vertically offset, the housing 80 may be provided at an upper portion of the enclosure 28. The housing 80 may be sized and shaped to encompass the linkage 703 components and may include sub-housings 81 and 82 to encompass the respective tracks of the first and second lateral members 710 and 711.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A self-tracking cart, comprising:
a body defining an enclosure into and from which a secondary cart is receivable and removable;
selectively rotatable first and second hitch assemblies;
first and second motive elements;
first and second steering assemblies to turn the first and second motive elements in opposite directions responsive to rotations of the first and second hitch assemblies; and
a linkage, which is coupled to the first and second hitch assemblies to cause the first and second hitch assemblies to rotate jointly in opposing directions, the linkage being disposed for non-interference with the secondary cart during reception and removal thereof into and from the enclosure and the linkage comprising:
vertically extensive end bars, each of which is coupled at a respective lower portion thereof to one of the first and second hitch assemblies and thereby jointly rotatable with the one of the first and second hitch assemblies;
lateral members, each of which is coupled at a respective longitudinal end thereof to a respective upper portion of one of the vertically extensive end bars, the lateral members extending from the vertically extensive bars in opposite directions; and
a connection member, which is pivotally coupled at opposed longitudinal ends thereof to respective distal ends of the lateral members.

2. The self-tracking cart according to claim 1, wherein the body comprises a door for permitting access to an interior of the enclosure and the secondary cart is slidably receivable and removable from the enclosure through the door.

3. The self-tracking cart according to claim 1, wherein the secondary cart is fully receivable in the enclosure.

4. The self-tracking cart according to claim 1, wherein the secondary cart has a size and shape that are substantially similar to those of the enclosure.

5. The self-tracking cart according to claim 1, wherein each of the first and second hitch assemblies comprises an elongate connection member pivotable about a midpoint thereof.

6. The self-tracking cart according to claim 1, wherein the first hitch assembly is configured to be pulled by a tractor vehicle, a preceding cart or an operator.

7. The self-tracking cart according to claim 1, wherein the second hitch assembly is configured to pull a trailing cart.

8. The self-tracking cart according to claim 1, further comprising:
a lead axle by which the first motive elements are coupled to the body; and
a trailing axle by which the second motive elements are coupled to the body,
wherein the first and second motive elements turn with respect to the lead and trailing axles.

9. The self-tracking cart according to claim 1, wherein the lateral members and the connection member of the linkage are operably disposed at or above an upper portion of the enclosure.

10. A self-tracking cart, comprising:
a body defining an enclosure into and from which a secondary cart is receivable and removable;
selectively rotatable first and second hitch assemblies;
first and second motive elements;
first and second steering assemblies to turn the first and second motive elements in opposite directions responsive to rotations of the first and second hitch assemblies; and
a linkage comprising:
vertically extensive end bars, each of which is coupled at a respective lower portion thereof to one of the first and second hitch assemblies and thereby jointly rotatable with the one of the first and second hitch assemblies;
lateral members, each of which is coupled at a respective longitudinal end thereof to a respective upper portion of one of the vertically extensive end bars, the lateral members extending from the vertically extensive bars in opposite directions; and
a connection member, which is pivotally coupled at opposed longitudinal ends thereof to respective distal ends of the lateral members,
the lateral members and the connection member being configured to cause the end bars to rotate jointly in opposing directions, the lateral members and the connection member of the linkage assembly being disposed to be vertically offset from the secondary cart during reception and removal thereof into and from the enclosure.

11. A self-tracking cart, comprising:
a body including lead and trailing axles, lead and trailing end walls supported on the lead and trailing axles, respectively, and an intermediate wall extending between the end walls to define an enclosure into and from which a secondary cart is receivable and removable;

selectively rotatable first and second hitch assemblies;

first and second motive elements;

first and second steering assemblies to turn the first and second motive elements in opposite directions responsive to rotations of the first and second hitch assemblies; and a linkage comprising:

vertically extensive end bars, each of which is coupled at a respective lower portion thereof to one of the first and second hitch assemblies and thereby jointly rotatable with the one of the first and second hitch assemblies;

lateral members, each of which is coupled at a respective longitudinal end thereof to a respective upper portion of one of the vertically extensive end bars, the lateral members extending from the vertically extensive bars in opposite directions; and a connection member, which is pivotally coupled at opposed longitudinal ends thereof to respective distal ends of the lateral members, the lateral members and the connection member being configured to cause the end bars to rotate jointly in opposing directions, the lateral members and the connection member of the linkage assembly being disposed to be vertically offset from the secondary cart during reception and removal thereof into and from the enclosure.

12. The self-tracking cart according to claim 11, wherein the body comprises a door for permitting access to an interior of the enclosure and the secondary cart is slidably receivable and removable from the enclosure through the door.

13. The self-tracking cart according to claim 11, wherein the secondary cart is fully receivable in the enclosure.

14. The self-tracking cart according to claim 11, wherein the secondary cart has a size and shape that are substantially similar to those of the enclosure.

15. The self-tracking cart according to claim 11, wherein each of the first and second hitch assemblies comprises an elongate connection member pivotable about a midpoint thereof.

16. The self-tracking cart according to claim 11, wherein the first hitch assembly is configured to be pulled by a tractor vehicle or a preceding cart.

17. The self-tracking cart according to claim 11, wherein the second hitch assembly is configured to pull a trailing cart.

18. The self-tracking cart according to claim 11, further comprising:

a lead axle by which the first motive elements are coupled to the body; and a trailing axle by which the second motive elements are coupled to the body.

19. The self-tracking cart according to claim 18, wherein the first and second motive elements turn with respect to the lead and trailing axles.

20. The self-tracking cart according to claim 11, wherein the lateral members and the connection member of the linkage are operably disposed at or above an upper portion of the enclosure.

* * * * *